US00RE45322E

(19) United States
(12) Reissued Patent
Levy

(10) Patent Number: US RE45,322 E
(45) **Date of Reissued Patent: *Jan. 6, 2015**

(54) FAST TYPING SYSTEM AND METHOD

(71) Applicant: Nuance Communications, Inc., Burlington, MA (US)

(72) Inventor: David H. Levy, Berkeley, CA (US)

(73) Assignee: Nuance Communications, Inc., Burlington, MA (US)

( * ) Notice: This patent is subject to a terminal disclaimer.

(21) Appl. No.: 13/690,667

(22) Filed: Nov. 30, 2012

Related U.S. Patent Documents

Reissue of:
(64) Patent No.: 7,175,438
Issued: Feb. 13, 2007
Appl. No.: 10/375,400
Filed: Feb. 28, 2003

U.S. Applications:
(63) Continuation of application No. 12/338,474, filed on Dec. 18, 2008, now Pat. No. Re. 43,977, which is an application for the reissue of Pat. No. 7,175,438.

(60) Provisional application No. 60/360,414, filed on Mar. 1, 2002.

(51) Int. Cl.
*G09B 1/00* (2006.01)
*G06F 3/041* (2006.01)

(52) U.S. Cl.
USPC ..... 434/167; 434/169; 434/362; 345/173

(58) Field of Classification Search
USPC ..... 434/167, 169, 118, 227; 715/816, 864
See application file for complete search history.

(56) References Cited

U.S. PATENT DOCUMENTS

| | | | | |
|---|---|---|---|---|
| 5,574,482 | A | 11/1996 | Niemeier | |
| 5,594,640 | A * | 1/1997 | Capps et al. | 715/532 |
| 6,154,758 | A * | 11/2000 | Chiang | 715/541 |
| 6,392,640 | B1 * | 5/2002 | Will | 345/184 |
| 6,674,895 | B2 | 1/2004 | Rafii et al. | |
| 6,755,657 | B1 * | 6/2004 | Wasowicz | 434/167 |
| 6,801,190 | B1 * | 10/2004 | Robinson et al. | 345/173 |
| 6,850,225 | B1 * | 2/2005 | Whitcroft | 345/168 |
| 6,864,809 | B2 | 3/2005 | O'Dell et al. | |

(Continued)

OTHER PUBLICATIONS

Kristensson, "Design and Evaluation of a Shorthand Aided Soft Keyboard", Master's Thesis in Cognitive Science Department of Computer and Information Science, Linkoping University, Sweden, Aug. 28, 2002.

(Continued)

*Primary Examiner* — Peter Egloff
(74) *Attorney, Agent, or Firm* — Wolf, Greenfield & Sacks, P.C.

(57) ABSTRACT

A method of interpreting keypad input includes identifying a first letter of a target word from activation of an initial key, identifying a set of possible intermediate letters of the target word in response to non-activating traversal of associated keys of the keypad following activation of the initial key, identifying a last letter of the target word from activation of a final key following the non-activating traversal, and then determining the target word based upon the identified first, intermediate and last letters. The method is particularly useful in key input devices sensitive to non-activating finger position above the keys.

97 Claims, 2 Drawing Sheets

(56) References Cited

U.S. PATENT DOCUMENTS

| | | | | |
|---|---|---|---|---|
| 6,982,658 | B2 | 1/2006 | Guo | |
| 7,098,896 | B2 | 8/2006 | Kushler et al. | |
| 7,149,550 | B2 | 12/2006 | Kraft et al. | |
| 7,199,786 | B2 | 4/2007 | Suraqui | |
| 7,251,367 | B2 | 7/2007 | Zhai | |
| 7,256,769 | B2 | 8/2007 | Pun et al. | |
| 2002/0077808 | A1* | 6/2002 | Liu et al. | 704/10 |
| 2002/0135499 | A1* | 9/2002 | Guo | 341/23 |
| 2003/0063775 | A1* | 4/2003 | Rafii et al. | 382/106 |
| 2003/0104839 | A1* | 6/2003 | Kraft et al. | 455/566 |
| 2003/0179930 | A1* | 9/2003 | O'Dell et al. | 382/187 |
| 2003/0190181 | A1* | 10/2003 | Kim | 404/472 |
| 2004/0164951 | A1* | 8/2004 | Lun Pun et al. | 345/156 |
| 2005/0190973 | A1 | 9/2005 | Kristensson et al. | |

OTHER PUBLICATIONS

Ward et al., "Dasher—A Data Entry Interface Using Continuous Gestures and Language Models", Proceeding UIST '00, San Diego, CA, pp. 129-137, 2000.

Zhai et al., "The Metropolis Keyboard—An Exploration of Quantitative Techniques for Virtual Keyboard Design", Proceedings UIST 00, San Diego, CA, pp. 119-120, 2000.

Zhai et al., "Performance Optimization of Virtual Keyboards", Human-Computer Interaction, vol. 17:89-XXX, 2002.

* cited by examiner

FAST TYPING SYSTEM AND METHOD

Matter enclosed in heavy brackets [ ] appears in the original patent but forms no part of this reissue specification; matter printed in italics indicates the additions made by reissue.

CROSS-REFERENCE TO RELATED APPLICATIONS

[This application claims priority from U.S. Provisional Application Serial No. 60/360,414, filed on Mar. 1, 2002. The entire contents of this provisional application are hereby incorporated by reference.]

*This application is a continuation reissue of U.S. application Ser. No. 12/338,474, filed on Dec. 18, 2008, which is a reissue of U.S. Pat. No. 7,175,483, which issued from application Ser. No. 10/375,400 filed on Feb. 28, 2003, which claims the benefit of priority under 35 U.S.C. §119(e) of U.S. Application Ser. No. 60/360,414, filed on Mar. 1, 2002. The contents of U.S. application Ser. No. 12/338,474 and U.S. Application Ser. No. 60/360,414 are hereby incorporated by reference herein in their entireties.*

*Notice: More than one reissue application has been filed for the reissue of U.S. Pat. No. 7,175,438. The reissue applications are: U.S. patent application Ser. No. 13/690,667 (the present application), filed on Nov. 30, 2012; U.S. patent application Ser. No. 14/535,941, which was filed on Nov. 7, 2014, and claims priority to the present application as a continuation reissue application; and U.S. patent application Ser. No. 12/338,474 filed on Dec. 18, 2008 to which the present application claims priority as a continuation reissue application.*

TECHNICAL FIELD

This invention relates to methods of typing, particularly on keyboards that are responsive to the position of a human finger above the keys.

BACKGROUND

The speed, accuracy and ease of written communication have always been important, but the advent of portable communications has increased the importance of these issues. Mobile telephones, as one example, provide the ability to write a text message, but the process is relatively slow, especially when compared with typing at a desktop. It would therefore be desirable to provide a system and method to increase the rate at which written information may be input to a device. It would therefore be desirable to provide a system that requires a minimum of training and retains the option of NOT using it, allowing users to try the new method, without committing to using it by buying the device.

SUMMARY

According to one aspect of the invention, a method of interpreting keypad input includes identifying a first letter of a target word from activation of an initial key, identifying a set of possible intermediate letters of the target word in response to non-activating traversal of associated keys of the keypad following activation of the initial key, identifying a last letter of the target word from activation of a final key following the non-activating traversal, and determining the target word based upon the identified first, intermediate and last letters.

In some implementations, determining the target word includes generating a set of possible words from which the target word is to be selected, and in some cases selecting a most probable target word from the set of possible words. The set of possible words preferably contains only words starting with the identified first letter and ending with the identified last letter, and is selected from a list of words stored in memory within a device connected to the keypad, such as a portable telephone or computer, for example.

In some cases, the method also includes displaying the target word on a display of a device connected to the keypad. In some embodiments, a word-separation character is displayed immediately after displaying the target word. Preferably the word-separation character is deleted in response to activation of a key associated with a punctuation character-.

In some implementations, the method includes editing identified letters to remove any of a predetermined set of non-occurring adjacent two letter combinations.

Preferably, in determining the target word, intermediate letters associated with finger traversal direction changes are preferentially considered. In some cases, only intermediate letters associated with finger traversal direction changes are identified as intermediate letters. In some applications, determining the target word includes selecting the target word from a list of words each starting with the identified first letter, containing all intermediate letters associated with finger traversal direction changes, and ending with the identified last letter.

In some embodiments, identifying any of the first, intermediate or last letters includes sensing an intensity of finger pressure upon an associated region of the keypad. Preferably, identifying either of the first and last letters includes sensing finger pressure intensity above a predetermined threshold. In some cases, keys traversed between activation of the initial and final keys during periods of finger pressure intensity below a predetermined threshold are omitted from the set of possible intermediate letters of the target word.

In some implementations, occurrences of duplicate sequential letters are identified in response to a transient change of finger position above an associated region of the keypad.

According to another aspect of the invention, an input device includes a keypad defining a set of keys associated with alphanumeric characters, and a processor adapted to perform the above method, such as through appropriately coded software.

In some embodiments, the keys are separably movable, spaced apart structures. In some other embodiments, the keys comprise adjacent regions of a contiguous keypad surface.

The input device may be structurally incorporated into a portable electronic device, such as a telephone or personal computer, or may be in the form of a stand-alone keyboard connected by cables or wireless communication link to another device, such as a desktop computing station.

The invention can provide an efficient means of text entry by cutting down on the number of keystrokes required to input text. Such advantages become particularly important in miniaturized keypads or keypads operated by one hand, or in portable devices frequently operated during multi-tasking.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
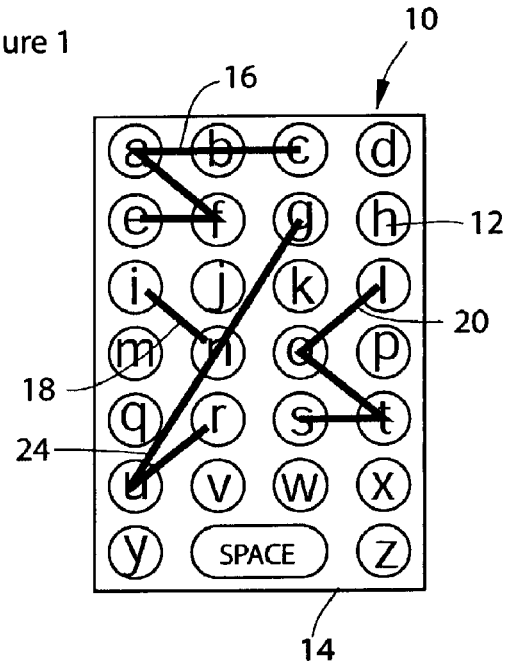
FIG. 1 shows four exemplary finger traces for entering desired text on an improved keypad device.

Referring first to FIG. 1, a keypad 10 has multiple keys identified by corresponding alphabetic characters 12, and a capacitive sensor or sense matrix 14 disposed beneath the surface of the keypad 10. The keypad may contain an array of discrete key switches, as is known in the art, in addition to the capacitive sense matrix, or the sense matrix may be fashioned to be responsive to key activation force or changes in capacitance related to intentional key activation by a user. Thus, the keypad includes means to determine finger location and whether or not a key has been pressed. The keys of the keypad may have independently movable, spaced-apart key caps, or the keys may comprise discrete regions of a single keypad surface, such as a flexible membrane. My pending U.S. patent application Ser. No. 09/862,948, filed May 22, 2001, describes some examples of at-a-distance sensors integrated into keypads of the latter type, and is incorporated by reference herein. Preferably the system retains all the hardware necessary to accomplish the typical input method of sequentially striking each key, such that the user does not need to commit to this new technique when purchasing the device.

The illustrated paths 16, 18, 20 and 24 are examples of finger traces effective to input words. In a preferred embodiment, the user first presses the first letter of a word, then traverse a path including at least certain intermediate letters of the word, and then presses the last letter of the word. As examples, word path 16 enters the word "cafe" by first pressing the letter "C," traversing the finger toward the letter "A," then the "F" before coming to rest on the letter "E" and pressing it. In response, the system compares the letters of the path traversed and compares it to the options available in an internal dictionary. The first and last letters are clearly defined by virtue of the user pressing the first and last keys. However, in this algorithm, the intermediate letters may consist of none or all of the letters "B", "A", and "F", in that order, potentially including CBAFE, CBAE, CAFE, CBFE, CBE, CAE, CFE and CE. However, the only word in the dictionary is CAFE. The system would therefore select, and display, "cafe" as the intended word. Preferably, the system automatically appends a "space" after the input word, later deleting the "space" if a punctuation mark is next entered by the user. Therefore, simply by pressing the letter "C," traversing the finger toward the letter "A," then the "F" before coming to rest on the letter "E" and pressing it, the system will enter the word CAFE, followed by a space.

In some cases, the system also identifies inflection points in the path traversed, preferentially including letters associated with these inflection points for consideration in word interpretation. For example, referring to word path 16, because the letters "A" and "F" are associated with inflection points (directional changes in the traverse of the finger), the system will include those letters in its analysis of the user's intent. According to this version of the algorithm, the options are significantly reduced from the list above, to CBAFE, and CAFE. Of course, the result is still CAFE, but the likelihood of eliminating potentially erroneous selections is vastly increased.

According to word path 18, the "I" is pressed, followed by the "N." The system follows the algorithms above to enter the word IN, followed by a space, into the display. In the case of single letter words, such as "I" or "A", the user will press the space bar to indicate the end of the word.

In some cases, two identical letters are entered in succession by raising the finger slightly to identify the repeated letter. For example, to write the word "stool," the user presses the letter "S", traverses the "T" and "O", raises and lowers her finger over the "O" and then completes the input by pressing the letter "L."

Figure 2:
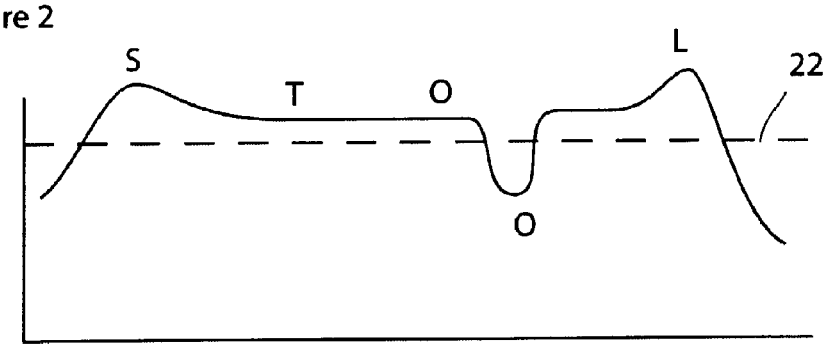
FIG. 2 shows a graph of signal intensity over time as the word STOOL is input.

FIG. 2 shows a measurement of finger proximity to capacitive sensor 14 as the finger traces word path 20 of FIG. 1, particularly useful for keypads not having discrete key input switches. This graph (like FIG. 3) shows signal intensity as the system measures finger elevation above the surface of keypad 10 with respect to time. Threshold 22 identifies an signal intensity below which the system will declare the user's intent to signify a duplicate letter entry in the case where the finger returns to approximately the same location. The system may be calibrated to the user's finger size as a key is pressed, thereby providing a measurement of signal strength to finger distance. In some other cases, threshold 22 signifies a differential signal change, rather than an absolute signal value, to eliminate the calibration step. For example, the threshold value could be measured against the derivative of signal intensity. Signal intensity increases as the user presses the "5", remains relatively constant during a standard "traverse" (as the finger drags on or near the keypad surface, in this case the letters "T" and "O"), drops as the finger raises to signify a doubling of the "O", and then increases again as the user presses the "L." The length along the horizontal axis is arbitrary as it will be dictated by the speed the user moves her finger. Utilizing the algorithms described, the user has indicated that the word starts with the letter "S", next includes the letter "T" (due to the change of direction of finger motion while over it), next includes "OO", and ends with "L." All the letters have been identified for inclusion in the target word and there is only one possible solution in the dictionary: STOOL.

Figure 3:
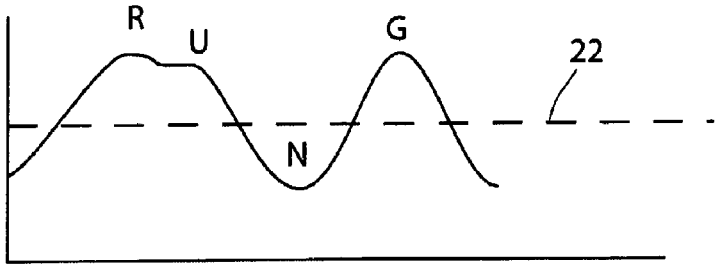
FIG. 3 shows a graph of signal intensity over time as the word RUN is input.

FIG. 3 shows a measurement of finger proximity to capacitive sensor 14 as the finger traces word path 24 of FIG. 1. In this example, the user raises her finger above the keypad during a traverse (i.e., before the final key is pressed). However, unlike the example of FIG. 2, the system measures a discontinuity in measurement of the finger position on the keypad (i.e., the finger returns to a different place), so a double letter is not entered. Furthermore, in this case, when signal intensity drops below threshold 22, and the system measures a discontinuity in measurement of the finger position, the system does not register intermediate locations as options for formation of the target word. With reference to word path 24, the user first presses "R." While this causes an increase of measured signal strength, this information is not critical if a key switch also monitors finger action. The finger traverses "U" and then leaves contact with the device, moving into the air and thereby reducing the signal to below threshold 22 until the user presses the letter "G." Note that while the letter "N" was traversed, it was not registered as a possible letter because the signal intensity was below threshold 22 at the moment the finger was over the letter "N." Also note that, while not indicated in the figure, imprecise use may have resulted in the following letters being registered: RUQG, RUG, RUJG, and RUKG of which only RUG would be a viable solution to post to the display.

Figure 4:
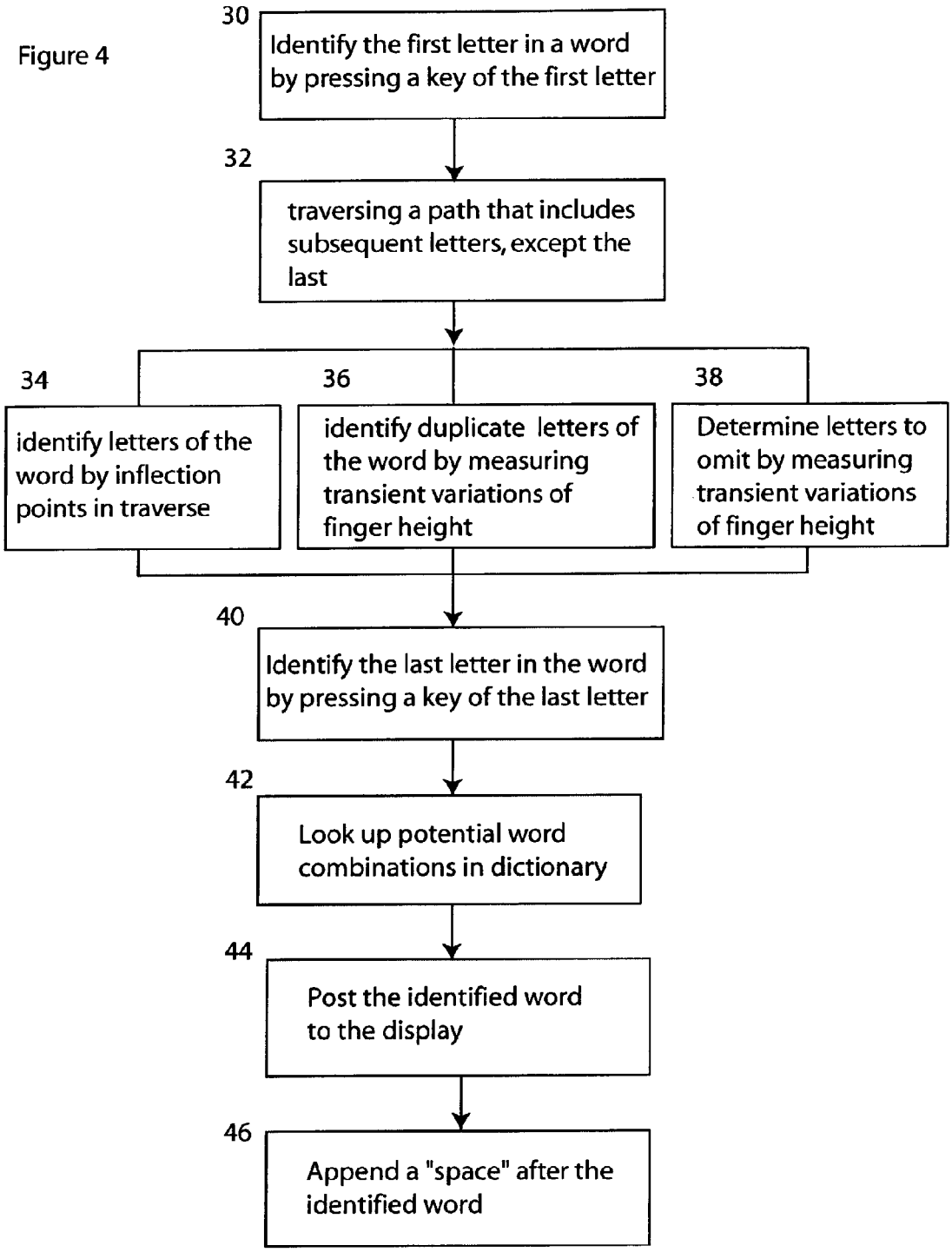
FIG. 4 shows a flowchart illustrating three alternate implementations of an improved word input interpretation algorithm.

FIG. 4 shows a flow chart of how the above algorithms may be implemented. In step 30, the user presses the first letter of the target word. This identification is made by pressing a key switch, key switch combination or by measuring transient variation of an at-a-distance-sensor, such as capacitive sensor 14. In step 32 the user traverses the path with their finger held close to the surface of the keypad, so that a measured signal intensity is above a threshold. This threshold may be the same as threshold 22. It will be understood by one skilled in the art that the threshold 22 may have different values for the different functions presented herein. Because the at-a-distance-sensor is disposed in a fixed relationship with respect to keypad 10, the system may identify which letter the finger is above at any moment. As the finger traverses the surface of the keypad 10, the system captures each letter disposed within a prescribed tolerance of the finger's location, accumulating the list of possible letters which may be included in the target word. The list includes each letter of the target word in the order it will appear in the final word. In any particular example, all or none of these intermediate letters may be included in the target word. The system may also include a rule-based algorithm that eliminates letter combinations that do not exist, such as Q-X, B-Z, and V-K.

In a basic implementation, the system may go directly to step 40. However, other implementations may include one or all of steps 34, 36 and 38. In step 34, the system identifies letters to include in the target word analysis, by using the at-a-distance-sensor to identify inflection points in the traverse of the finger. Any significant change in direction is considered an inflection point. By determining one or more letters that must be included, or are at least preferentially included, in the target word in this manner, the system significantly decreases the number of possible word options that must be analyzed to determine the intended, or "target" word of the user. This both speeds the process and increases the likelihood of selecting the correct target word. In step 36, the system identifies if the user intends to use the same letter twice in succession in response to the user lifting their finger and lowering it again, thereby creating an associated signal (shown in FIG. 2) that may be read by the at-a-distance-sensor. In step 38, the system omits letters from consideration if the user's finger performs a traverse above them while the signal strength is below threshold 22, indicating that the finger was far from the keypad at the moment of traverse.

In step 40 the user presses the last letter in the target word, thereby also signaling to the system that all potential letters have been identified. The system then compares the list of potential words (such as that given in FIG. 1) to a dictionary, in order to identify the preferred target word. In the event that more than one word contains the identified letters, the system may select the first one at random, give the user an option to select from a list, or other algorithm known in the art. In step 44 the system displays the target word to the display. In some cases, the system automatically adds a "space" character when displaying the target word.

A number of embodiments of the invention have been described. Nevertheless, it will be understood that various modifications may be made without departing from the spirit and scope of the invention. Accordingly, other embodiments are within the scope of the following claims.

What is claimed is:

[1. A method of interpreting keypad input, the method including identifying a first letter of a target word from activation of an initial key;

identifying a set of possible intermediate letters of the target word in response to non-activating traversal of associated keys of the keypad following activation of the initial key;

identifying a last letter of the target word from activation of a final key following the non-activating traversal; and determining the target word based upon the identified first, intermediate and last letters.]

[2. The method of claim 1 wherein determining the target word comprises generating a set of possible words from which the target word is to be selected.]

[3. The method of claim 2 including selecting a most probable target word from the set of possible words.]

[4. The method of claim 2 wherein the set of possible words contains only words starting with the identified first letter and ending with the identified last letter.]

[5. The method of claim 2 wherein the set of possible words is selected from a list of words stored in memory within a device connected to the keypad.]

[6. The method of claim 1 further comprising displaying the target word on a display of a device connected to the keypad.]

[7. The method of claim 1 further comprising displaying a word-separation character immediately after displaying the target word.]

[8. The method of claim 7 further comprising deleting the word-separation character in response to activation of a key associated with a punctuation character.]

[9. The method of claim 1 further comprising editing identified letters to remove any of a predetermined set of non-occurring adjacent two letter combinations.]

[10. The method of claim 1 wherein determining the target word includes preferentially considering intermediate letters associated with finger traversal direction changes.]

[11. The method of claim 10 wherein determining the target word includes selecting the target word from a list of words each starting with the identified first letter, containing all intermediate letters associated with finger traversal direction changes, and ending with the identified last letter.]

[12. The method of claim 1 wherein identifying any of the first, intermediate or last letters includes sensing an intensity of finger pressure upon an associated region of the keypad.]

[13. The method of claim 12 wherein identifying either of the first and last letters includes sensing finger pressure intensity above a predetermined threshold.]

[14. The method of claim 12 wherein keys traversed between activation of the initial and final keys during periods of finger pressure intensity below a predetermined threshold are omitted from the set of possible intermediate letters of the target word.]

[15. The method of claim 1 further comprising identifying occurrences of duplicate sequential letters in response to a transient change of finger position above an associated region of the keypad.]

[16. The method according to claim 1, wherein the final key is associated with the last letter of the target word.]

[17. An input device comprising a keypad defining a set of keys associated with alphanumeric characters; and a processor adapted to identify a first letter of a target word from activation of an initial key;

identify a set of possible intermediate letters of the target word in response to non-activating traversal of associated keys of the keypad following activation of the initial key;

identify a last letter of the target word from activation of a final key following the non-activating traversal; and to determine the target word based upon the identified first, intermediate and last letters.]

[18. The input device according to claim 17 wherein the keypad comprises a plurality of spaced apart key structures each associated with a corresponding one of the set of keys.]

[19. The input device according to claim 17 wherein the keypad comprises a continuous sheet defining a plurality of discrete key regions each associated with a corresponding one of the set of keys.]

*20. A method of interpreting input from a keypad having a layout of letters, the method determining a target word from a trace of a user's finger across the keypad, the method comprising:*

*identifying a first letter of the target word based, at least in part, on a sensed position of the user's finger within a first region of the keypad;*

*identifying a set of possible intermediate letters of the target word in response to non-activating traversal of the user's finger across other regions of the keypad following the sensed position of the user's finger within the first region;*

*identifying a last letter of the target word based, at least in part, on a sensed position of the user's finger within a final region of the keypad following the non-activating traversal; and*

*determining the target word based, at least in part, on the identified first, intermediate and last letters,*

*wherein identifying the first, intermediate and last letters comprises sensing changes in measured capacitance levels at corresponding positions along the keypad; and*

*wherein the layout of the letters on the keypad remains constant during the trace.*

*21. The method of claim 20 wherein determining the target word comprises generating a set of possible words from which the target word is to be selected.*

*22. The method of claim 21, including selecting a most probable target word from the set of possible words.*

*23. The method of claim 21, wherein the set of possible words contains only words starting with the identified first letter and ending with the identified last letter.*

*24. The method of claim 21, wherein the set of possible words is selected from a list of words stored in memory within a device connected to the keypad.*

*25. The method of claim 20 further comprising displaying the target word on a display of a device connected to the keypad.*

*26. The method of claim 20 further comprising displaying a word-separation character immediately after displaying the target word.*

*27. The method of claim 26 further comprising deleting the word-separation character in response to activation of a key associated with a punctuation character.*

*28. The method of claim 20 further comprising editing identified letters to remove any of a predetermined set of non-occurring adjacent two letter combinations.*

*29. The method of claim 20 wherein determining the target word includes preferentially considering intermediate letters associated with finger traversal direction changes.*

*30. The method of claim 20 wherein determining the target word comprises selecting the target word from a list of words each starting with the identified first letter, containing all intermediate letters associated with finger traversal direction changes, and ending with the identified last letter.*

*31. The method of claim 20 wherein identifying any of the first, intermediate or last letters comprises sensing an intensity of finger pressure upon an associated region of the keypad.*

*32. The method of claim 31 wherein identifying either of the first and last letters comprises sensing finger pressure intensity above a predetermined threshold.*

*33. The method of claim 31 wherein, during the non-activating traversal of the user's finger across other regions of the keypad, keys traversed during periods of finger pressure intensity below a predetermined threshold are omitted from the set of possible intermediate letters of the target word.*

*34. The method of claim 20 further comprising identifying occurrences of duplicate sequential letters in response to a transient change of finger position above an associated region of the keypad.*

*35. The method of claim 20, wherein each of the first, other, and final regions are each associated with a respective, single letter.*

*36. The method of claim 20, wherein each of the first, other, and final regions are defined by independently displaceable spaced apart key structures.*

*37. The method of claim 20, wherein the first, other, and final regions are adjacent regions of a contiguous keypad surface.*

*38. The method of claim 20 wherein determining the target word comprises selecting the target word from a list of words each containing intermediate letters associated with finger traversal direction changes.*

*39. The method of claim 20, wherein identifying either of the first and last letters comprises sensing a change in measured capacitance levels above a predetermined threshold.*

*40. The method of claim 20, wherein identifying one or more of the set of possible intermediate letters comprises sensing changes in measured capacitance levels within a predetermined threshold.*

*41. The method of claim 20, wherein identifying the first letter of the target word comprises sensing activation of an initial key region of the keypad.*

*42. The method of claim 41, wherein sensing activation of the initial key region comprises sensing a change in a measured capacitance level above a predetermined threshold at a corresponding position along the keypad.*

*43. The method of claim 20, wherein identifying the final letter of the target word comprises sensing activation of a final key region of the keypad.*

*44. The method of claim 43, wherein sensing activation of the final key region comprises sensing a change in a measured capacitance level above a predetermined threshold at a corresponding position along the keypad.*

*45. The method of claim 20, wherein the keypad is configured to allow a user to enter letters associated with non-adjacent regions of the keypad without requiring the user to individually press each of the non-adjacent regions.*

*46. A method of interpreting input from a keypad having a layout of letters, the method determining a target word from a trace of a user's finger across the keypad, the method comprising:*

*identifying a first letter of a target word from activation of an initial key;*

*identifying a set of possible intermediate letters of the target word in response to non-activating traversal of associated keys of the keypad following activation of the initial key;*

*identifying a last letter of the target word from activation of a final key following the non-activating traversal; and*

*determining, by a processor associated with the keypad, the target word based upon the identified first, intermediate and last letters;*

*wherein the layout of the letters on the keypad remains constant during the trace.*

*47. The method of claim 46 wherein determining the target word comprises generating a set of possible words from which the target word is to be selected.*

*48. The method of claim 47 including selecting a most probable target word from the set of possible words.*

*49. The method of claim 47 wherein the set of possible words contains only words starting with the identified first letter and ending with the identified last letter.*

*50. The method of claim 47 wherein the set of possible words is selected from a list of words stored in memory within a device connected to the keypad.*

*51. The method of claim 46 further comprising displaying the target word on a display of a device connected to the keypad.*

*52. The method of claim 46 further comprising displaying a word-separation character immediately after displaying the target word.*

*53. The method of claim 52 further comprising deleting the word-separation character in response to activation of a key associated with a punctuation character.*

*54. The method of claim 46 further comprising editing identified letters to remove any of a predetermined set of non-occurring adjacent two letter combinations.*

*55. The method of claim 46 wherein determining the target word includes preferentially considering intermediate letters associated with finger traversal direction changes.*

*56. The method of claim 55 wherein determining the target word includes selecting the target word from a list of words each starting with the identified first letter, containing all intermediate letters associated with finger traversal direction changes, and ending with the identified last letter.*

*57. The method of claim 46 wherein identifying any of the first, intermediate or last letters includes sensing an intensity of finger pressure upon an associated region of the keypad.*

*58. The method of claim 57 wherein identifying either of the first and last letters includes sensing finger pressure intensity above a predetermined threshold.*

*59. The method of claim 57 wherein keys traversed between activation of the initial and final keys during periods of finger pressure intensity below a predetermined threshold are omitted from the set of possible intermediate letters of the target word.*

*60. The method of claim 46 further comprising identifying occurrences of duplicate sequential letters in response to a transient change of finger position above an associated region of the keypad.*

*61. The method of claim 46 wherein determining the target word includes selecting the target word from a list of words each containing intermediate letters associated with finger traversal direction changes.*

*62. The method of claim 46, wherein identifying either of the first and last letters includes sensing a change in measured capacitance levels above a predetermined threshold.*

*63. The method of claim 46, wherein identifying one or more of the set of possible intermediate letters includes sensing changes in measured capacitance levels within a predetermined threshold.*

*64. The method of claim 46, wherein identifying the first letter of the target word comprises sensing a change in a measured capacitance level above a predetermined threshold at a corresponding position along the keypad.*

*65. The method of claim 46, wherein identifying the final letter of the target word comprises sensing a change in a measured capacitance level above a predetermined threshold at a corresponding position along the keypad.*

*66. The method of claim 46, wherein the keypad is configured to allow a user to enter letters associated with non-adjacent regions of the keypad without requiring the user to individually press each of the non-adjacent regions.*

*67. A method of interpreting keypad input, the method comprising:*

*identifying a first letter of a target word based, at least in part, on a sensed position of a user's finger within a first region of a keypad;*

*identifying a set of possible intermediate letters of the target word in response to non-activating traversal of the user's finger across other regions of the keypad following the sensed position of the user's finger within the first region;*

*identifying a last letter of the target word based, at least in part, on a sensed position of the user's finger within a final region of the keypad following the non-activating traversal; and*

*determining the target word based, at least in part, on the identified first, intermediate and last letters, the determining comprising preferentially considering intermediate letters associated with one or more inflection points;*

*wherein identifying the first, intermediate and last letters comprises sensing changes in measured capacitance levels at corresponding positions along the keypad.*

*68. A method of interpreting keypad input, the method comprising:*

*identifying a first letter of a target word based, at least in part, on a sensed position of a user's finger within a first region of a keypad,*

*identifying a set of possible intermediate letters of the target word in response to traversal of the user's finger from the first region across other regions of the keypad, wherein the traversal of the user's finger across the other regions of the keypad comprises traversal of at least one key of the keypad corresponding to a letter that is not in the target word, and wherein identifying the set of possible intermediate letters comprises identifying the letter that is not in the target word as a possible intermediate letter;*

*identifying a last letter of the target word based, at least in part, on a sensed position of the user's finger within a final region of the keypad at the end of the traversal; and*

*determining the target word based, at least in part, on the identified first, intermediate and last letters,*

*wherein identifying the first, intermediate and last letters is based, at least in part, on sensed changes in measured capacitance levels at corresponding positions of the keypad.*

*69. The method of claim 68, wherein each of the first, other, and final regions is associated with a respective, single letter.*

*70. The method of claim 68, wherein the first, other, and final regions are adjacent regions of a contiguous keypad surface.*

*71. The method of claim 68, wherein identifying either of the first and last letters comprises sensing a change in measured capacitance levels above a predetermined threshold.*

*72. The method of claim 68, wherein identifying one or more of the set of possible intermediate letters comprises sensing changes in measured capacitance levels below a predetermined threshold.*

*73. The method of claim 68, wherein identifying the first letter of the target word comprises sensing activation of an initial key region of the keypad.*

*74. The method of claim 73, wherein sensing activation of the initial key region comprises sensing a change in a measured capacitance level above a predetermined threshold at a corresponding position on the keypad.*

*75. The method of claim 68, wherein identifying the final letter of the target word comprises sensing activation of a final key region of the keypad.*

*76. The method of claim 75, wherein sensing activation of the final key region comprises sensing a change in a measured capacitance level above a predetermined threshold at a corresponding position on the keypad.*

*77. The method of claim 68, wherein the keypad is configured to allow a user to enter letters associated with non-adjacent regions of the keypad without requiring the user to individually press each of the non-adjacent regions.*

*78. An input device comprising:*

*a keypad defining a set of regions associated with alphabetic characters; and*

*a processor adapted to:*

*identify a first letter of a target word based, at least in part, on a sensed position of a user's finger within a first region of the keypad;*

*identify a set of possible intermediate letters of the target word in response to traversal of the user's finger from the first region across other regions of the keypad, wherein the traversal of the user's finger across the other regions of the keypad comprises traversal of at least one key of the keypad corresponding to a letter that is not in the target word, and wherein the processor is adapted to identify the set of possible intermediate letters at least in part by identifying the letter that is not in the target word as a possible intermediate letter;*

*identify a last letter of the target word based, at least in part, on a sensed position of the user's finger within a final region of the keypad at the end of the traversal; and*

*determine the target word based, at least in part, upon the identified first, intermediate and last letters,*

*wherein the processor is adapted to identify the first, intermediate and last letters based, at least in part, on sensed changes in measured capacitance levels at corresponding positions along the keypad.*

*79. The input device of claim 78 wherein the first, other, and final regions are adjacent regions of a contiguous keypad surface.*

*80. The input device of claim 78, further comprising a capacitive sense matrix.*

*81. The input device according to claim 78, wherein the input device is configured to allow a user to enter letters associated with non-adjacent ones of the regions of the keypad without requiring the user to individually press each of the non-adjacent regions.*

*82. The input device according to claim 78, wherein each of the regions of the keypad is identified by an associated alphabetic character, and wherein the regions are arranged to form a standard keypad layout.*

*83. An input device comprising:*

*a keypad having a layout of letters; and*

*a processor adapted to determine a target word from a trace of a user's finger across the keypad at least in part by:*

*identifying a first letter of the target word based, at least in part, on a sensed position of the user's finger within a first region of the keypad;*

*identifying a set of possible intermediate letters of the target word in response to non-activating traversal of the user's finger across other regions of the keypad following the sensed position of the user's finger within the first region;*

*identifying a last letter of the target word based, at least in part, on a sensed position of the user's finger within a final region of the keypad following the non-activating traversal; and*

*determining the target word based, at least in part, on the identified first, intermediate and last letters,*

*wherein identifying the first, intermediate and last letters comprises sensing changes in measured capacitance levels at corresponding positions along the keypad; and*

*wherein the layout of the letters on the keypad remains constant during the trace.*

*84. The input device of claim 83, wherein the processor is further adapted to display the target word on a display of a device connected to the keypad.*

*85. The input device of claim 83, wherein identifying either of the first and last letters comprises sensing a change in measured capacitance levels above a predetermined threshold.*

*86. The input device of claim 83, wherein identifying one or more of the set of possible intermediate letters comprises sensing changes in measured capacitance levels within a predetermined threshold.*

*87. The input device of claim 83, wherein identifying the first letter of the target word comprises sensing activation of an initial key region of the keypad.*

*88. The input device of claim 87, wherein sensing activation of the initial key region comprises sensing a change in a measured capacitance level above a predetermined threshold at a corresponding position along the keypad.*

*89. The input device of claim 83, wherein identifying the final letter of the target word comprises sensing activation of a final key region of the keypad.*

*90. The input device of claim 89, wherein sensing activation of the final key region comprises sensing a change in a measured capacitance level above a predetermined threshold at a corresponding position along the keypad.*

*91. The input device of claim 83, wherein the input device is configured to allow a user to enter letters associated with non-adjacent regions of the keypad without requiring the user to individually press each of the non-adjacent regions.*

*92. The input device of claim 83, the keypad defining regions associated with the letters, wherein each of the regions of the keypad is identified by an associated letter, and wherein the regions are arranged to form a standard keypad layout.*

*93. A method of interpreting input from a keypad having a layout of letters, the method determining a target word from a trace of a user's finger across the keypad, the method comprising:*

*using a processor to perform:*

*identifying a first letter of the target word based, at least in part, on information generated in response to sensing the user's finger within a first region of a keypad;*

*identifying a set of possible intermediate letters of the target word based on information generated in response to non-activating traversal of the user's finger across at least one other region of the keypad following the sensing of the user's finger within the first region;*

*identifying a last letter of the target word based, at least in part, on information generated in response to sensing the user's finger within a final region of the keypad following the non-activating traversal; and*

*determining the target word based, at least in part, on the identified first, intermediate and last letters,*

*wherein the layout of the letters on the keypad remains constant during the trace.*

*94. The method of claim 93, wherein determining the target word comprises generating a set of possible words from which the target word is to be selected.*

*95. The method of claim 94 including selecting a most probable target word from the set of possible words.*

*96. The method of claim 93, further comprising displaying a word-separation character immediately after displaying the target word.*

*97. The method of claim 96, further comprising deleting the word-separation character in response to activation of a key associated with a punctuation character.*

*98. An input device comprising:*

*a keypad having a layout of letters; and*

*a processor adapted to determine a target word from a trace of a user's finger across the keypad at least in part by:*

*identifying a first letter of the target word based, at least in part, on information generated in response to sensing the user's finger within a first region of a keypad;*

*identifying a set of possible intermediate letters of the target word based on information generated in response to non-activating traversal of the user's finger across at least one other region of the keypad following the sensing of the user's finger within the first region;*

*identifying a last letter of the target word based, at least in part, on information*

*generated in response to sensing the user's finger within a final region of the keypad following the non-activating traversal; and*

*determining the target word based, at least in part, on the identified first, intermediate and last letters,*

*wherein the layout of the letters on the keypad remains constant during the trace.*

*99. The input device of claim 98, wherein the processor is further adapted to display the target word on a display of a device connected to the keypad.*

*100. The input device of claim 98, wherein the input device is configured to allow a user to enter letters associated with non-adjacent regions of the keypad without requiring the user to individually press each of the non-adjacent regions.*

*101. The input device of claim 98, the keypad defining regions associated with the letters, wherein each of the regions of the keypad is identified by an associated letter, and wherein the regions are arranged to form a standard keypad layout.*

*102. A non-transitory computer-readable storage medium storing software that, when executed by a processor, causes the processor to perform a method of interpreting input from a keypad having a layout of letters, the method determining a target word from a trace of a user's finger across the keypad, the method comprising:*

*identifying a first letter of the target word based, at least in part, on information generated in response to sensing the user's finger within a first region of a keypad;*

*identifying a set of possible intermediate letters of the target word based on information generated in response to non-activating traversal of the user's finger across at least one other region of the keypad following the sensing of the user's finger within the first region;*

*identifying a last letter of the target word based, at least in part, on information generated in response to sensing the user's finger within a final region of the keypad following the non-activating traversal; and*

*determining the target word based, at least in part, on the identified first, intermediate and last letters,*

*wherein the layout of the letters on the keypad remains constant during the trace.*

*103. The non-transitory computer-readable storage medium of claim 102, wherein determining the target word comprises generating a set of possible words from which the target word is to be selected.*

*104. The non-transitory computer-readable storage medium of claim 103 including selecting a most probable target word from the set of possible words.*

*105. A method of interpreting input from a keypad, the method comprising:*

*using a processor to perform:*

*identifying a first letter of a target word based, at least in part, on information generated in response to sensing a user's finger within a first region of the keypad;*

*identifying a set of possible intermediate letters of the target word based, at least in part, on information generated in response to traversal by the user's finger of at least one region of the keypad corresponding to a letter that is not in the target word, wherein identifying the set of possible intermediate letters comprises identifying the letter that is not in the target word as a possible intermediate letter;*

*identifying a last letter of the target word based, at least in part, on information generated in response to sensing a user's finger within a final region of the keypad at the end of the traversal; and*

*determining the target word based, at least in part, on the identified first, intermediate and last letters.*

*106. The method of claim 105, wherein determining the target word comprises generating a set of possible words from which the target word is to be selected.*

*107. The method of claim 106 including selecting a most probable target word from the set of possible words.*

*108. The method of claim 105, further comprising displaying a word-separation character immediately after displaying the target word.*

*109. The method of claim 108, further comprising deleting the word-separation character in response to activation of a key associated with a punctuation character.*

*110. A non-transitory computer-readable storage medium storing software that, when executed by a processor, causes the processor to perform a method comprising:*

*identifying a first letter of a target word based, at least in part, on information generated in response to sensing a user's finger within a first region of a keypad;*

*identifying a set of possible intermediate letters of the target word based, at least in part, on information generated in response to traversal by the user's finger of at least one region of the keypad corresponding to a letter that is not in the target word, wherein identifying the set of possible intermediate letters comprises identifying the letter that is not in the target word as a possible intermediate letter;*

*identifying a last letter of the target word based, at least in part, on information generated in response to sensing a user's finger within a final region of the keypad at the end of the traversal; and*

*determining the target word based, at least in part, on the identified first, intermediate and last letters.*

*111. The non-transitory computer-readable storage medium of claim 110, wherein determining the target word comprises generating a set of possible words from which the target word is to be selected.*

*112. The non-transitory computer-readable storage medium of claim 111 including selecting a most probable target word from the set of possible words.*

*113. An input device comprising:*

*a keypad having a layout of letters; and*

*a processor adapted to determine a target word from a trace of a user's finger across the keypad at least in part by:*

*identifying a first letter of a target word from activation of an initial key;*

*identifying a set of possible intermediate letters of the target word in response to non-activating traversal of associated keys of the keypad following activation of the initial key;*

*identifying a last letter of the target word from activation of a final key following the non-activating traversal; and*

*determining, by a processor associated with the keypad, the target word based upon the identified first, intermediate and last letters;*

*wherein the layout of the letters on the keypad remains constant during the trace.*

*114. The input device of claim 113, wherein the processor is further adapted to display the target word on a display of a device connected to the keypad.*

*115. The input device of claim 113, wherein the input device is configured to allow a user to enter letters associated with non-adjacent regions of the keypad without requiring the user to individually press each of the non-adjacent regions.*

*116. The input device of claim 113, the keypad defining regions associated with the letters, wherein each of the regions of the keypad is identified by an associated letter, and wherein the regions are arranged to form a standard keypad layout.*

* * * * *